(12) United States Patent
Salkic

(10) Patent No.: US 12,552,469 B2
(45) Date of Patent: Feb. 17, 2026

(54) EXTERIOR TRIM FOR A MOTOR VEHICLE

(71) Applicant: Mercedes-Benz Group AG, Stuttgart (DE)

(72) Inventor: Asmir Salkic, Ulm (DE)

(73) Assignee: Mercedes-Benz Group AG, Stuttgart (DE)

( * ) Notice: Subject to any disclaimer, the term of this patent is extended or adjusted under 35 U.S.C. 154(b) by 491 days.

(21) Appl. No.: 18/253,902

(22) PCT Filed: Nov. 15, 2021

(86) PCT No.: PCT/EP2021/081611
§ 371 (c)(1),
(2) Date: May 22, 2023

(87) PCT Pub. No.: WO2022/106325
PCT Pub. Date: May 27, 2022

(65) Prior Publication Data
US 2024/0010283 A1    Jan. 11, 2024

(30) Foreign Application Priority Data
Nov. 23, 2020  (DE) .................. 10 2020 007 140.6

(51) Int. Cl.
*B62D 35/00*     (2006.01)
*B60R 13/04*     (2006.01)
*B62D 25/02*     (2006.01)

(52) U.S. Cl.
CPC ............ *B62D 35/008* (2013.01); *B60R 13/04* (2013.01); *B62D 25/025* (2013.01)

(58) Field of Classification Search
CPC .... B60R 13/04; B62D 25/025; B62D 35/008; B62D 35/02
(Continued)

(56) References Cited

U.S. PATENT DOCUMENTS

| 4,616,869 A | * | 10/1986 | Sacco | ................. B62D 35/008 |
|---|---|---|---|---|
|  |  |  |  | 296/180.1 |
| 5,924,765 A | * | 7/1999 | Lee | ..................... B62D 25/025 |
|  |  |  |  | 267/116 |
| 9,096,279 B2 |  | 8/2015 | Beierl et al. |  |

FOREIGN PATENT DOCUMENTS

| DE | 36 13 301 A1 | 10/1987 |  |
|---|---|---|---|
| DE | 10026264 A1 * | 11/2001 | ............. B62D 35/00 |

(Continued)

OTHER PUBLICATIONS

PCT/EP2021/081611, International Search Report dated Mar. 2, 2022 (Two (2) pages).

(Continued)

*Primary Examiner* — Jason S Daniels
(74) *Attorney, Agent, or Firm* — Crowell & Moring LLP

(57) ABSTRACT

An exterior trim for a motor vehicle includes an exterior trim part having a central shape-retaining subcomponent and a first elastic subcomponent connected on a first side of the central shape-retaining subcomponent and a second elastic subcomponent connected on a second side of the central shape-retaining subcomponent. The central shape-retaining subcomponent is adjustable from a first position into a second position and the first elastic subcomponent and a first trim surface of the first elastic subcomponent and the second elastic subcomponent a second trim surface of the second elastic subcomponent are adjustable.

8 Claims, 4 Drawing Sheets

(58) Field of Classification Search
USPC .................................. 296/1.08, 180.1, 181.5
See application file for complete search history.

(56) References Cited

FOREIGN PATENT DOCUMENTS

| | | |
|---|---|---|
| DE | 10 2008 046 314 A1 | 6/2009 |
| DE | 10 2009 031 534 A1 | 2/2010 |
| DE | 10 2012 018 284 A1 | 3/2013 |
| DE | 10 2013 110 363 A1 | 3/2015 |
| DE | 10 2018 214 703 B3 | 12/2019 |
| DE | 10 2019 108 418 A1 | 10/2020 |
| DE | 10 2019 119 210 A1 | 1/2021 |
| FR | 2729114 A1 * | 7/1996 ................ B60J 5/04 |
| FR | 2 983 451 A1 | 6/2013 |
| WO | WO 02/051688 A2 | 7/2002 |
| WO | WO 2019/174768 A1 | 9/2019 |

OTHER PUBLICATIONS

German-language German Office Action issued in German application No. 10 2020 007 140.6 dated Nov. 15, 2021 (Eight (8) pages).

* cited by examiner

EXTERIOR TRIM FOR A MOTOR VEHICLE

BACKGROUND AND SUMMARY OF THE INVENTION

The invention relates to an exterior trim for a motor vehicle.

Exterior trim parts forming part of the motor vehicle exterior skin, which can have their shape changed, are increasingly being used on the exterior of motor vehicles. It is therefore, for example, desirable for reasons of aerodynamics or safety to design corresponding exterior trim parts whose shapes can be changed.

Such an exterior trim for a motor vehicle already arises from DE 10 2012 018 284 A1, wherein an exterior trim part in the form of a side sill trim part comprises a shape-retaining subcomponent and a further subcomponent connecting to this, which is formed as a membrane material wound onto a winding shaft. When adjusting the exterior trim part from a first position into a further position, the trim surface of the membrane material, which is unwound from the winding shaft or is wound up onto this, can thereby be enlarged.

An exterior trim for a motor vehicle having an exterior trim part in the form of a side sill trim is also already known from DE 36 13 301 A1, wherein several shape-retaining subcomponents are connected with each other in the region of respective predetermined bending points or film hinges. The exterior trim part can hereby be displaced from a position near the sill into a position further from the sill, in order to improve the aerodynamics of the motor vehicle.

An exterior trim for a motor vehicle having an exterior trim part in the form of a sill trim element can also be taken as known from DE 10 2009 031 534 A1, wherein at least one shape-retaining subcomponent can be displaced outwards or inwards in the transverse direction of the vehicle relative to a further dimensionally-stable subcomponent of the exterior trim part.

Finally, further textile constructions of exterior trims are known, wherein corresponding textiles are used as exterior trim parts and, for example, are stretched over a mesh structure. Such textiles are, however, not sufficiently shape-retaining and deform considerably, in particular at relatively high driving speeds.

It is the object of the present invention to provide an exterior trim of the above-mentioned type, the exterior trim part of which is especially simply constructed and also has a high-value appearance when adjusted into both of its positions.

The exterior trim for a motor vehicle according to the invention comprises at least one exterior trim part having at least one shape-retaining subcomponent and at least one subcomponent connecting to this. For adjusting the exterior trim part between one position and a further position, while changing its trim surface, according to the invention the further subcomponent is formed from an elastic material, the trim surface of which can be reversibly or flexibly changed by applying force.

In contrast to the above-cited prior art, in particular according to DE 10 2012 018 284 A1, wherein the trim surface of the further subcomponent is increased by means of unwinding a sheet material from a winding shaft or is reduced by means of winding it up onto this winding shaft, it is provided according to the invention that the increase or reduction of the respective trim surface of the further subcomponent of the exterior trim part is achieved by forming this further subcomponent from a correspondingly elastic material, which can be reversibly stretched, so can be increased or can be reduced in terms of area, by correspondingly applying force.

As a result, an extremely simple exterior trim part can hereby be made from at least one shape-retaining subcomponent and at least one elastic subcomponent, which are, for example and in particular, integrally and seamlessly connected with each other or blend into each other. An elaborate construction of the exterior trim part is therefore not necessary, and, secondly, both subcomponents—the subcomponent and the elastic subcomponent—can blend into each other or adjoin each other seamlessly or as one piece. This is not only very advantageous for aesthetic reasons, rather it furthermore prevents a considerable accumulation of dirt in the region of the exterior trim of the motor vehicle.

As already previously explained, it has been shown to be especially advantageous if the exterior trim part comprises at least one shape-retaining subcomponent and at least one elastic subcomponent, which are integrally and seamlessly connected with each other. An especially simple construction of the exterior trim part can hereby be realized and moreover, an especially favourable connection or a favourable transition between the shape-retaining and the elastic subcomponents.

In this context, it has further been shown to be advantageous if the shape-retaining subcomponent and the further elastic subcomponent of the exterior trim part are manufactured in a two-component injection moulding process. Such a method can be carried out especially process-reliably and enables a simple manufacture of the exterior trim part from the correspondingly necessary materials.

In a further embodiment of the invention, an elastic subcomponent is respectively connected on both sides of a central, shape-retaining subcomponent. The shape-retaining subcomponent can hereby be displaced outwards or inwards in the transverse direction of the vehicle in a side sill trim in an especially simple manner.

A further advantageous embodiment of the invention provides that the exterior trim has a further, shape-retaining trim element which can be adjusted into at least two positions, and by means of which the exterior trim part can be adjusted between the one position and the further position. The shape-retaining further trim element can thereby, for example, be a wind deflector or similar arranged on the side in the region of a side sill trim, which can be displaceable from a retracted position, in which it displaces the exterior trim part into the one position, for example a retracted position, into an extended position, so that the exterior trim part is displaced into the further position in conjunction with this, in which this forms the exterior trim of the vehicle, in particular in the region of the side sill trim. Or put in other words, the further, shape-retaining trim element serves as a force-applying element, by means of which the exterior trim part is adjusted between its at least two positions.

In a further advantageous embodiment of the invention, the exterior trim part forms the exterior trim of the motor vehicle in its one position and forms a recess in its further position, in which the further shape-retaining trim element is received in its one position in which it forms the exterior trim. Consequently, the further, shape-retaining trim element lies in its one position so as to form the recess in the exterior trim part, with the exterior trim part, for example as a result of the elasticity of at least one elastic subcomponent, being independently or automatically displaced into the further position when the further, shape-retaining trim element is displaced into the extended position. Optionally, assistance by means of actuators or similar would also of course be conceivable here, by means of which the exterior trim part can be displaced between the two positions.

A further advantageous embodiment of the invention provides that an actuating element, by means of which the shape-retaining trim element can be displaced between the at least positions, is provided on the interior side of the exterior trim part facing away from the outside. According to this embodiment, the actuating element thus creates the corresponding force, by means of which the at least one elastic subcomponent can be acted upon, so that its trim surface or surface area correspondingly changes.

A further advantageous embodiment of the invention provides that the exterior trim is formed as a longitudinal sill trim of a side sill of the motor vehicle. Precisely in this region of the motor vehicle, an aerodynamic adaptation of the exterior trim is especially useful, since currents that move along the side sill trim can therefore be correspondingly removed, in order to hereby lower the aerodynamic resistance.

The advantages referred to above in connection with the exterior trim according to the invention apply in the same way for the method.

Further advantages and details of the invention result from the description of preferred exemplary embodiments below, as well as by means of the drawings. The features and feature combinations referred to in the description, as well as the features and feature combinations referred to below in the description of the figures and/or shown solely in the figures can be used not only in each specified combination but also in other combinations or alone without leaving the scope of the invention.

BRIEF DESCRIPTION OF THE DRAWINGS

FIGS. 1a, 1b respectively show a schematic sectional view through an exterior trim part of an exterior trim for a motor vehicle in the form of a side sill trim along a sectional plane running in the transverse direction of the vehicle or in the vertical direction of the vehicle, wherein FIG. 1a shows a central, shape-retaining subcomponent of the exterior trim part, which is connected with further respective shape-retaining subcomponents provided on the end of the exterior trim part by means of at least two further subcomponents formed from an elastic material, wherein in FIG. 1a, the shape-retaining subcomponent is arranged in a retracted position of the exterior trim part and, in FIG. 1b, is arranged in an extended position, changing the trim surface;

DETAILED DESCRIPTION OF THE DRAWINGS

Figure 1A:
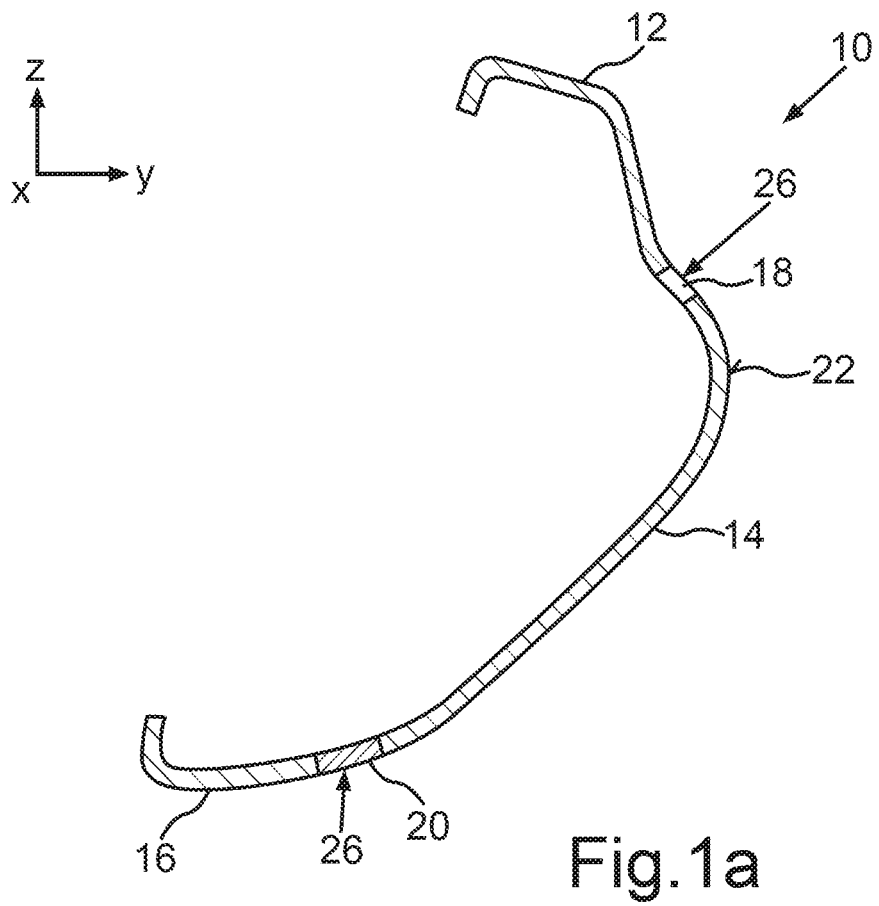
Figure 1B:
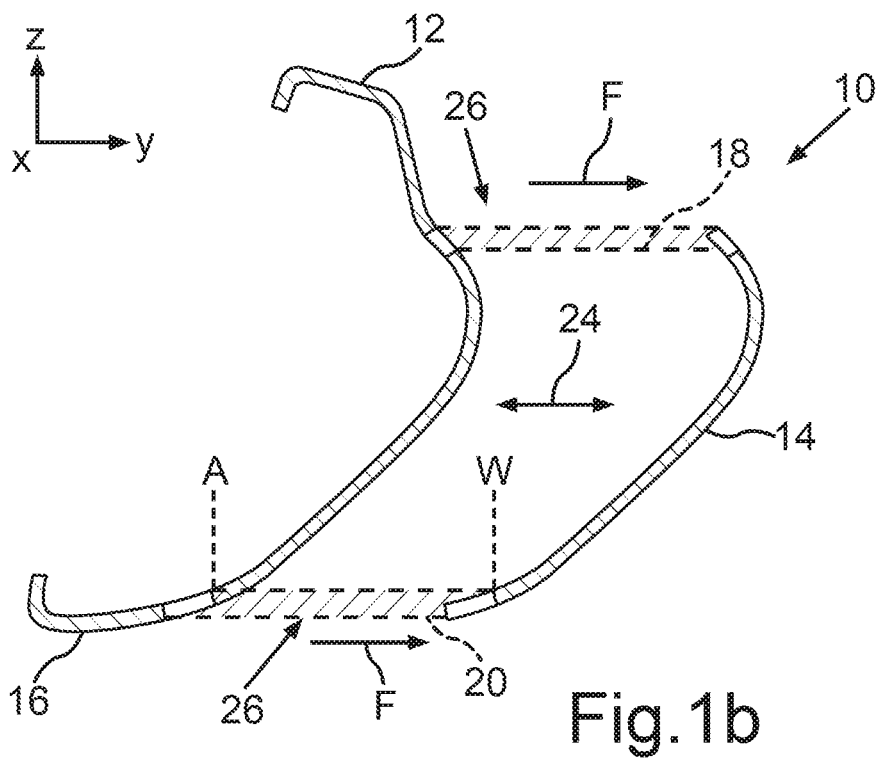

In FIGS. 1a and 1b, an exterior trim for a motor vehicle in the form of a side sill trim or door sill trim can respectively be seen in a schematic sectional view along a sectional plane running in the vertical direction of the vehicle (x direction) or in the transverse direction of the vehicle (y direction). Of this side sill trim, a cross-section of an exterior trim part 10 is shown in the present case, which covers the side sill on the outside and underneath.

The exterior trim part 10 hereby comprises three shape-retaining subcomponents 12, 14, 16, between which two further subcomponents 18, 20, made of an elastic material explained in still more detail in the following, are arranged. Each of these subcomponents 12, 14, 16, 18, 20 here extends in the longitudinal direction of the vehicle (x direction) of the side sill with an at least substantially consistent cross-section.

The respective shape-retaining subcomponents 12, 14, 16 and the elastic subcomponents 18, 20 are connected with each other as one piece in the present case or the exterior trim part 10 is here formed as one piece. This occurs in the present exemplary embodiment by means of manufacturing the exterior trim part 10 in a so-called two-component injection moulding process. In particular, the exterior trim part is here manufactured in a multi-material injection moulding process, wherein the subcomponents 12, 14, 16 are manufactured from a shape-retaining, non-reversibly elastic plastic and the subcomponents 18, 20 are manufactured from a reversibly elastic plastic. The overall exterior trim part 10 is thereby manufactured seamlessly, at least on the outside, and has an outside 22 that forms part of the exterior skin of the motor vehicle, in particular in the initial position that can be seen in FIG. 1a, which is formed uninterrupted and continuously, so is not interrupted by means of corresponding seams.

The exterior trim part 10 in the form of the side sill trim can be adjusted from the initial position that can be seen in FIG. 1a into the further position shown in FIG. 1b. In particular, the central shape-retaining subcomponent 14, which is connected with the respective outer, shape-retaining subcomponents 12 and 16 by means of the respective elastic subcomponents 18, 20, can be adjusted or can be displaced from the initial position A that can be seen in FIG. 1a into the further position W shown in FIG. 1b. This can, for example, occur by means of several actuators, another type of adjusting mechanism, or also in hydraulic or pneumatic ways. The displacement or adjustment of the shape-retaining subcomponent 14 thereby occurs here—as is symbolically indicated by means of an arrow 24—at least substantially horizontally and in the transverse direction of the vehicle (y direction).

When adjusting the shape-retaining subcomponent 14 from the initial position A shown in FIG. 1a into the further position W shown in FIG. 1b, both elastic subcomponents

18, 20, which are arranged or connected on one side on the shape-retaining subcomponent 14 and on the other side on the respective shape-retaining subcomponents 12, 16 at the end, are acted upon by a respective force F, which is created by means of the respective adjusting mechanism (actuators, other adjusting mechanisms, pneumatic or hydraulic adjusting devices), in that the corresponding shape-retaining subcomponent 14 is displaced—here, substantially linearly. The two elastic subcomponents 18, 20 are hereby correspondingly extended and therefore their trim surface 26 on the outside 22 of the exterior trim part 10 correspondingly significantly increases. While the respective trim surfaces 26 of the elastic subcomponents 18, 20 are accordingly formed as relatively small or narrow in FIG. 1a, these are considerably or multiple times larger in FIG. 1b. The enlargement of the subcomponents 18, 20 is possible by means of the reversible elasticity of their material. Put in other words, by means of the extension of the shape-retaining subcomponent 14, both elastic subcomponents 18, 20 are correspondingly stretched. This stretching, deformation, shape changing and adaptation of the elastic subcomponents 18, 20 is reversible and can be repeated any number of times. A seamless deformation or similar as well as a shape change of the exterior trim part 10 or of the longitudinal beam trim are thus herein enabled. The elastic subcomponents 18, 20 are preferably thereby formed from an elastic plastic, which, regardless of its stretching or of the application of force, substantially retains its color or does not undertake any change in color due to the force F. In particular, a black plastic is especially well suited for this. Of course, plastics in the vehicle color can also be provided for the subcomponents 18, 20.

The adjusting of the exterior trim part 10 from the initial position A shown in FIG. 1a into the further position W shown in FIG. 1b in particular serves to improve the aerodynamics in the region of the side sill, so that, for example, airflows arising behind the front wheels can be removed from the exterior skin of the motor vehicle, to which the respective outsides 22 of the exterior trim part 10 belong, in an improved manner. The air resistance of the vehicle hereby, for example, changes, whereby a more energy-efficient movement can be realized. When the motor vehicle is stationery, an improved access to the vehicle can simultaneously be enabled or an improved design is preserved.

Furthermore, it can be seen in FIG. 1b that the shape stability of the subcomponent 14 remains unchanged during the displacement between the initial position into the further position W.

Figure 2A:
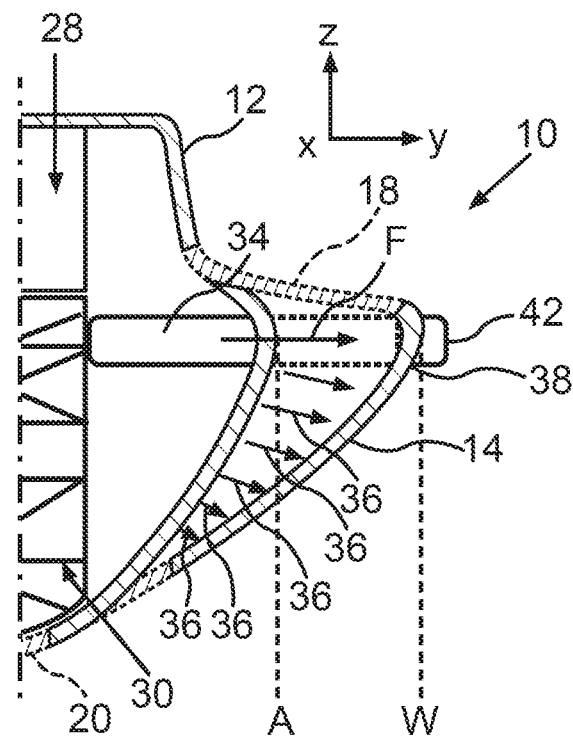
FIGS. 2a, 2b show respective perspective sectional views of an exterior trim for a motor vehicle in the form of a side sill trim according to a further embodiment, wherein the exterior trim part, similarly to the embodiment according to FIGS. 1a, 1b in turn comprises a central and shape-retaining subcomponent arranged on one-piece, elastic subcomponents, which can be adjusted between a retracted and an extended position of the exterior trim part by means of a schematically suggested actuating element.
Figure 2B:
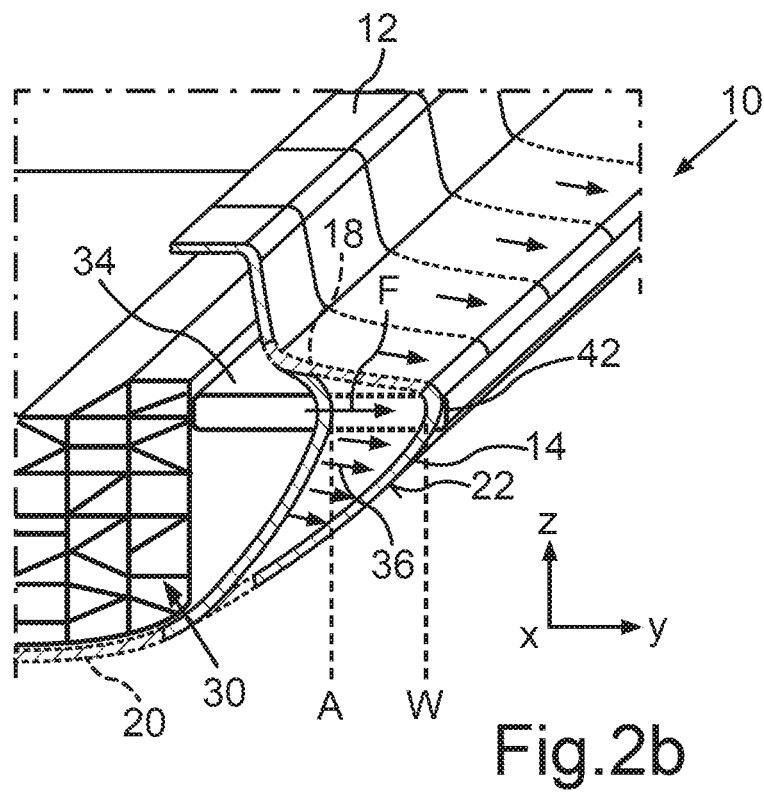

A further exterior trim is shown in FIGS. 2a and 2b. A further exterior trim in the form of a side sill trim, which in turn in particular comprises an exterior trim part 10, can be seen here in a schematic, front sectional view or a perspective and schematic sectional view. A sill element 28 on the shell side can be seen arranged behind or inside this in the transverse direction of the vehicle (y direction) in FIG. 2a, which sill element extends in the longitudinal direction of the vehicle (x direction) and roughly horizontally. An energy absorption element 30, which is arranged on the outer side of an energy storer in the form of a high-voltage battery in the transverse direction of the vehicle (y direction), is arranged underneath this sill element 28 on the shell side. Here, the exterior trim part 10 is formed at least substantially similarly to the embodiment according to FIGS. 1a and 1b. Therefore, the exterior trim part 10 also here comprises three shape-retaining subcomponents 12, 14, 16, between which an elastic subcomponent 18, 20 is respectively arranged. Here too, the respective cross-section of the subcomponents 12 to 20 is consistent across the length of the exterior trim part 10 in the longitudinal direction of the vehicle (x direction), at least across a considerable longitudinal region. In the present exemplary embodiment, the shape-retaining subcomponents 12, 14, 16 are also, for example, formed from a hard plastic, for example a PP or PA and are integrally and seamlessly connected with each other in a two-component injection moulding process by means of the respective elastic subcomponents 18, 20, which can, for example, be manufactured from an elastomeric material or similar.

A core 34 is hereby arranged between the energy absorption element 30 and the central shape-retaining subcomponent 14 of the exterior trim part 10, which core is supported on one side on the energy absorption element 30 and on the other side on the upper edge of the central shape-retaining subcomponent 14, on its inner side. The core 34 can thereby, for example, be extended or enlarged in the transverse direction of the vehicle (y direction) by means of a medium, in particular air, whereby the central subcomponent 14 can be displaced outwards in the transverse direction of the vehicle (y direction) from the respective initial position A shown in FIGS. 2A and 2B into the respective further position W. The displacing movement from the initial position into the further position W of the shape-retaining subcomponent 14 is hereby suggested by means of respective arrows 36. It can hereby in particular be seen that the elastic subcomponent 12 is displaced further outwards in its upper region in line with the longer arrows 36 in the transverse direction of the vehicle (y direction) than in a lower region. Put in other words: The upper elastic subcomponent 18 is herein stretched further outwards in the transverse direction of the vehicle (y direction) than the lower elastic subcomponent 20 during the displacement of the shape-retaining subcomponent 14 from the initial position A into the further position W. In the present case it is, however, the case that both the elastic subcomponent 18 and also the lower elastic subcomponent 20 are stretched, changing or herein increasing their respective trim surfaces 26, by means of the application of force by means of the core 14 by means of the central, shape-retaining element 14. Likewise, the elastic subcomponents 18, 20 are reduced in their respective trim surfaces 26 during the backwards displacement of the central, shape-retaining subcomponent 14 out of the further position W into the initial position A. Due to the reversible or elastic flexibility of the subcomponents 18, 20, the displacement or changing of the exterior trim part 10 can be repeated any number of times. The shape-retaining subcomponent 14 as well as the subcomponents 12 and 16 thereby stay in their shape, at least mostly unchanged. Additionally, the subcomponent 12 and the shape-retaining subcomponent 16 also remain in place during the displacing of the central shape-retaining subcomponent 14.

It is clear that, instead of the core 34, another displacement mechanism can, once again, be used in order to change or to adjust the stable subcomponent or the exterior trim part 10 between its two positions A, W or shapes.

In this second exemplary embodiment, a decorative element 42 in the form of a trim strip is arranged on the outside 22 of the exterior trim part 10 in the region or at the height of the actuating element or core 34, which decorative element, during adjustment of the core or actuating element 34, is also displaced between the initial position A and the further position W, together with the upper region 38 of the shape-retaining subcomponent 14. By means of this decorative element 42, the elastic subcomponent 18 is at least partially concealed in the initial position A. The decorative element 42 is thereby in particular formed as a chrome-plated or similarly coated trim. The design of the elastic subcomponents 18, 20 can be similar to the embodiment described in the context of the exemplary embodiment according to FIGS. 1a and 1b.

Figure 3A:
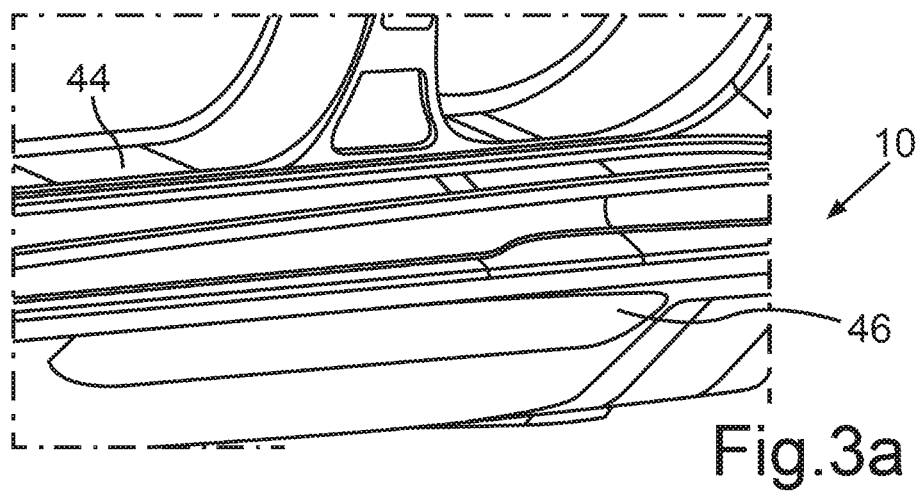
FIGS. 3a, 3b show respective cut-away perspective views of a further embodiment of an exterior trim for a motor vehicle in the form of a side sill trim having a further, shape-retaining trim element that can be displaced from a folded-in position shown in FIG. 3a into a folded-out position shown in FIG. 3b.
Figure 3B:
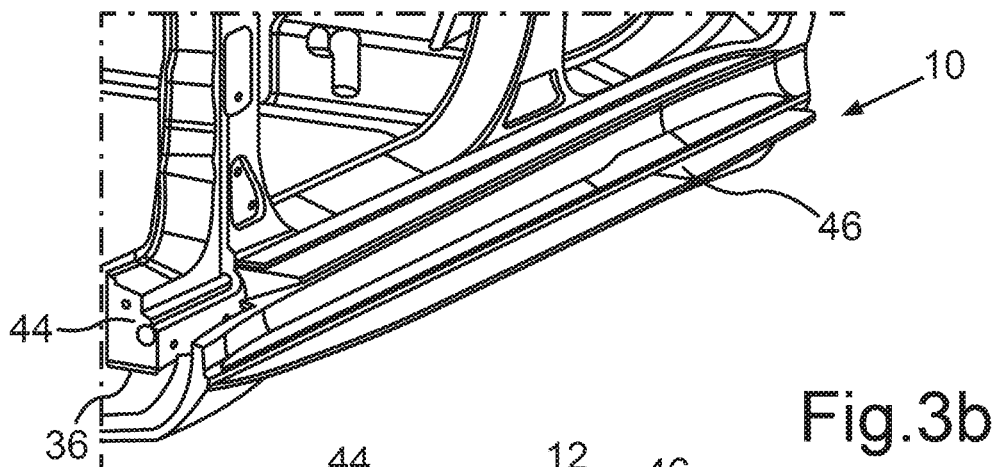

In FIGS. 3a and 3b, a motor vehicle body in the region of a corresponding side sill 44 on the left vehicle side—as viewed in the forward direction of travel—is respectively shown in a cut-away perspective view. The side sill 44 is hereby associated with an exterior trim in the form of a side sill trim, which—similarly to the preceding embodiments—substantially comprises an exterior trim part 10, which is explained in still more detail in the following, viewed along with FIGS. 4 to 5b. Along with this exterior trim part 10, the exterior trim comprises a further, shape-retaining trim element 46 in the form of a wing, a bar or similar, which can be displaced from a first position shown in FIG. 3a, in which the further trim element 46 forms a part of the exterior trim, into the second position shown in FIG. 3b, in which the exterior trim part 10 at least substantially solely forms the exterior trim of the side sill 44.

FIG. 4 again shows the wing-like further trim element 46 in a perspective sectional view enlarged compared to FIGS. 3a and 3b, in its second position, which protrudes in the transverse direction of the vehicle (y direction) with its upper side 48, for example, approximately horizontally.

On viewing FIGS. 3b and 4 together, it additionally becomes clear that an energy absorption element 30 is once again arranged on the underside of the side sill 44, which for its part belongs to the shell-side side wall of the body, as has already been described in connection with the embodiment according to FIGS. 2a and 2b.

In the following, in particular with reference to FIGS. 5a and 5b, the specific embodiment of the exterior trim according to this third embodiment will now be explained. FIGS. 5a and 5b thereby respectively show the exterior trim, in a simply perspective sectional view along a sectional plane running in the vertical direction of the vehicle (z direction) or in the transverse direction of the vehicle (y direction). The exterior trim part 10 can thereby in particular be seen, which, in the present case—as can in particular be seen in FIGS. 3a to 4—extends outside and under the side sill 44. In the present case, the exterior trim part in turn comprises respective shape-retaining subcomponents 12, 14, 16, between which respective elastic subcomponents 18, 20 are arranged. The respective subcomponents 12 to 20 thereby in turn extend over a corresponding longitudinal region of the exterior trim part 10 in the longitudinal direction of the vehicle (x direction), with an at least substantially consistent cross-section. The mentioned longitudinal region thereby substantially corresponds to the length of the further shape-retaining trim element 46.

Figure 4:
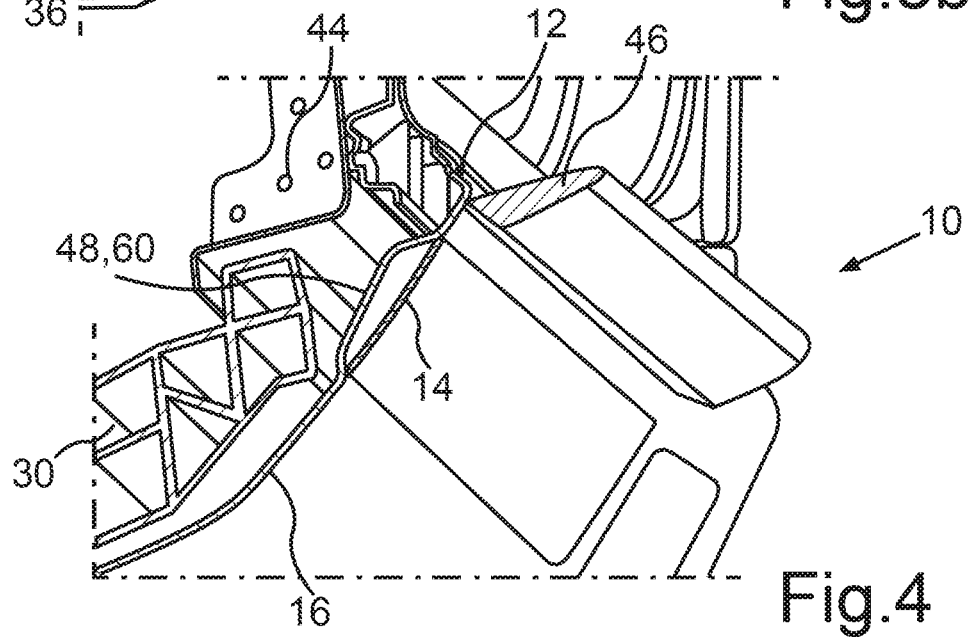
FIG. 4 shows a cut-away and perspective sectional view of the exterior trim in the form of the side sill trim according to FIGS. 3a and 3b, wherein the shape-retaining trim element can be seen in its extended position.
Figure 5A:
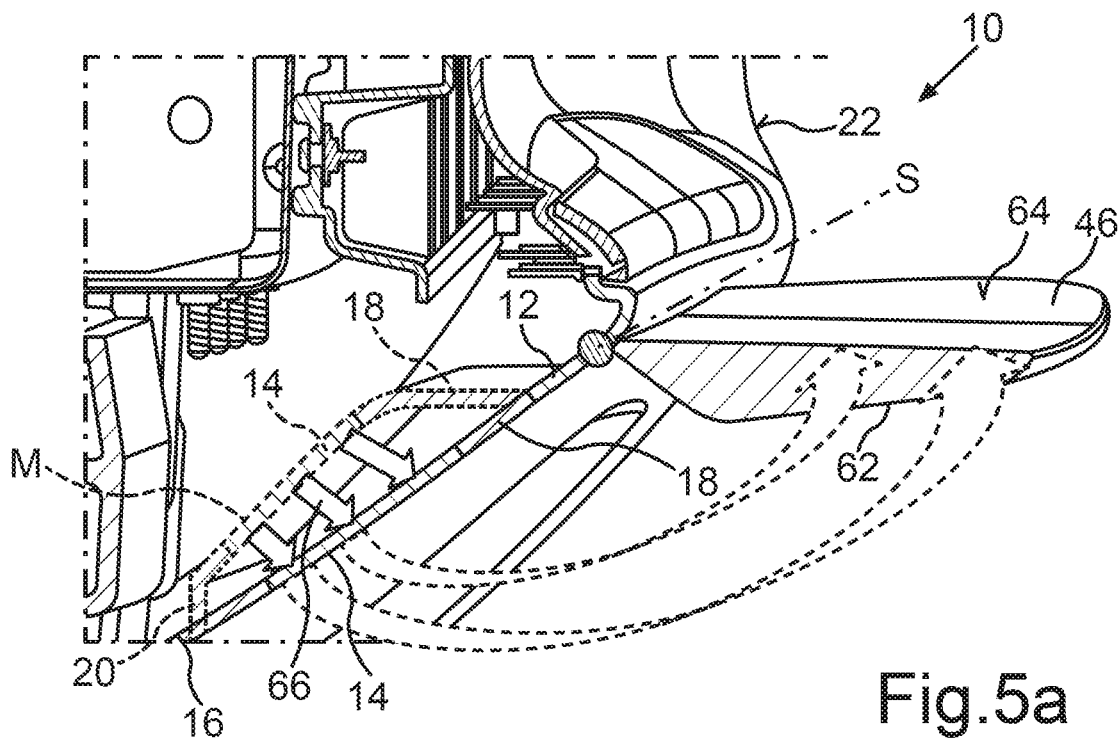
FIGS. 5a, 5b show respective perspective sectional views through the exterior trim in the form of the side sill trim according to FIGS. 3a to 4, along a sectional plane running in the transverse direction of the vehicle or in the vertical direction of the vehicle, wherein it is illustrated that, in its one position, in which the foldable trim element is situated in its folded-out position, the exterior trim part forms the exterior trim of the motor vehicle in this region and, in its further position, forms a recess in which the further, shape-retaining trim element is received in its folded-in position in which this forms the exterior trim.
Figure 5B:
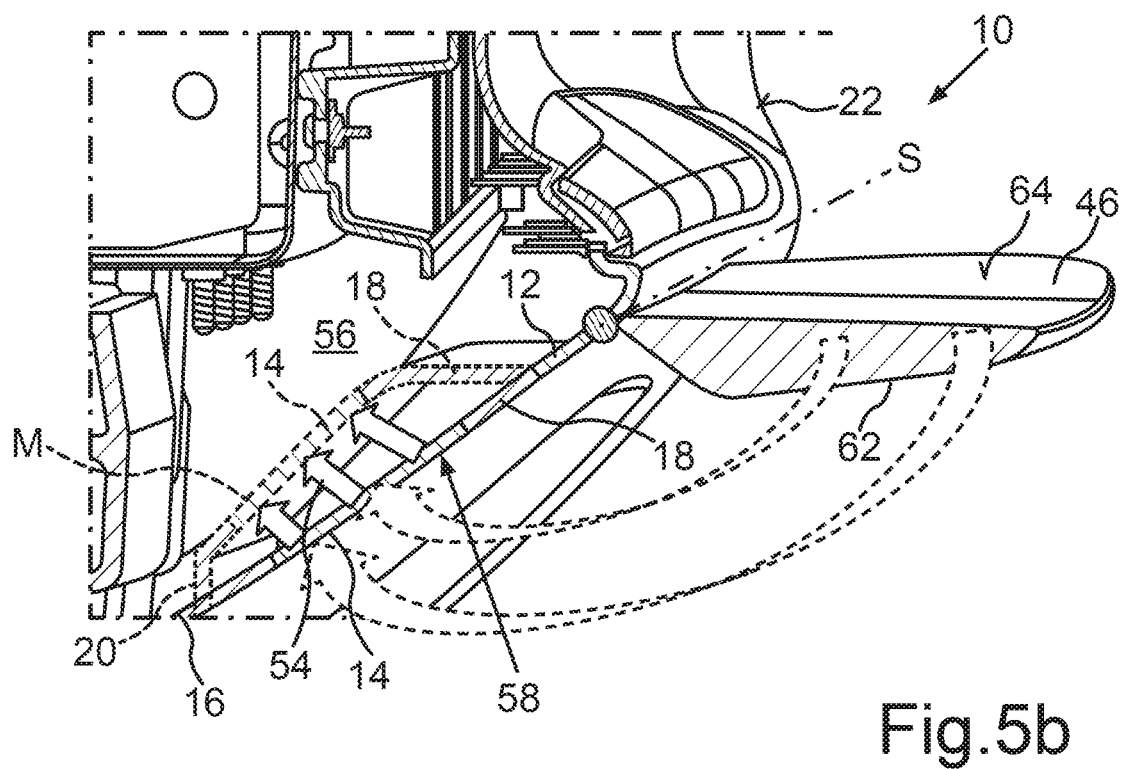

As can further be seen from FIGS. 5a and 5b, the wing-like shape-retaining trim element 46 can be pivoted or displaced around a pivot axis S, and indeed out of the first position near the trim, as is also shown in FIG. 3a, into the position shown in FIGS. 3b and 4, in which the trim element 46 protrudes approximately horizontally outwards from the exterior trim part 10 to the vehicle exterior.

In the retracted first position, the trim element 46 thereby lies inside a hollow-type recess 48, which can in particular be seen in FIG. 4 and which connects the two external shape-retaining subcomponents 12, 16 with each other. The recess 48 is thereby formed integrally with the two subcomponents 12, 16 and is consequently also made of a shape-retaining material, for example a PP or PA plastic. In the context of the invention it should, however, be considered that, if necessary, this hollow-like recess 48 can also be dispensed with. In the exemplary embodiment, the recess 48 extends from a lower end 50 of the upper shape-retaining subcomponent 12 to an upper end 52 of the lower shape-retaining subcomponent 16.

The central shape-retaining subcomponent 14 is connected, by means of the respective elastic subcomponents 18, 20, with the lower end of the upper shape-retaining subcomponent 12 or with the upper end of the lower shape-retaining subcomponent 16. The respective subcomponents 12 to 20 as well as the recess 48 are here—as already described in connection with the first two exemplary embodiments—manufactured in a two-component injection moulding process and are formed seamlessly or integrally.

If the trim element 46 which can be folded out around the pivot axis S is now in its first position, which can also be seen in FIG. 3a, then the shape-retaining central subcomponent 14 is displaced inwards in the transverse direction of the vehicle (y direction) according to the arrows 54 illustrated in FIG. 5b as a result of the application of force by the trim element 46 and comes at least substantially into contact with an outside of the recess 48. If this recess 48 is not present, then the shape-retaining subcomponent 14 is moved into a free intermediate space 56 between the exterior trim part 10 and the side sill 44 or the energy absorption element 30. By means of folding down the trim element 46 into the first position, which is near the trim part, the shape-retaining subcomponent 14 is therefore displaced out of its trim position V, in which this forms the exterior trim visible from outside with its outside 58, together with the remaining outside 22 of the exterior trim part 10, into a hollow position M, in which this rests in the recess 48 or forms a hollow 60 for the trim element 46 in its first, folded-out position. Along with this displacement of the central, shape-retaining subcomponent 14, the respective elastic subcomponents 18, 20 are stretched by means of the displacing of the subcomponent 14 and the application of force associated with this, which changes or increases its respective trim surface, so that they, together with the subcomponent 14, form the hollow which receives the trim element 46 in its folded-down position. This hollow 60—formed by means of the subcomponent 14 as well as the elastic subcomponents 18, 20— lies on the outside in the recess 48 of the exterior trim part 10 in the present case. Optionally, this recess 48—as already explained—may also, however, not be present.

It can therefore be seen that the shape-retaining central subcomponent 14 as well as the elastic subcomponents 18, 20 substantially adjust to a back side 62 of the trim element 46, if this is displaced into its first, retracted position. This is in particular illustrated in FIG. 5 by the corresponding arrows 54.

If the trim element 46 is displaced out of its first position, in which this forms the exterior skin of the exterior trim with its outside 64 together with the outside 22, into the folded-out position according to FIG. 5A, in which this protrudes approximately horizontally to the vehicle outside, then the shape-retaining subcomponent 14 is returned, together with the elastic subcomponents 18, 20, into its original position, namely the trim position, according to the arrows 66, due to the reversible elasticity of these two subcomponents 18, 20, in which trim position the subcomponents 14, 18, 20, together with the trim part 10, form the exterior skin of the exterior trim. It can hereby be seen that the elastic subcomponents 18, 20 are then situated in an at least mostly unstretched position or shape. Due to the reversible elasticity of the subcomponents 18, 20, the adjustment of the trim element 46 can occur any number of times, without hereby leading to disadvantages regarding the outer appearance of the exterior trim.

If the trim element 46 is situated in its folded-out, approximately horizontal position, then this has—as already described in the context of the two other exemplary embodiments—in particular aerodynamic advantages, since, for example, an airflow going from the region of the front wheels along the exterior trim can be selectively removed, in order to hereby reduce the flow resistance of the vehicle. An entry or exit of a vehicle occupant can also simultaneously be improved by means of the adjustment of the trim element 46 and, if necessary, the crash properties of the vehicle in a side impact can also be improved.

The invention claimed is:

1. An exterior trim for a motor vehicle, comprising:
   an exterior trim part (10) having a central shape-retaining subcomponent (14); and
   a first elastic subcomponent (18) connected on a first side of the central shape-retaining subcomponent (14) and a second elastic subcomponent (20) connected on a second side of the central shape-retaining subcomponent (14);
   wherein the central shape-retaining subcomponent (14) is adjustable from a first position (A) into a second position (W) and wherein the first elastic subcomponent (18) and a first trim surface (26) of the first elastic subcomponent (18) and the second elastic subcomponent (20) and a second trim surface (26) of the second elastic subcomponent (20) are adjustable.

2. The exterior trim according to claim 1, wherein the central shape-retaining subcomponent (14) is integrally connected with the first elastic subcomponent (18) and the second elastic subcomponent (20).

3. The exterior trim according to claim 1, wherein the central shape-retaining subcomponent (14) is manufactured from a shape-retaining, non-reversibly elastic plastic and wherein the first elastic subcomponent (18) and the second elastic subcomponent (20) are manufactured from a reversibly elastic plastic.

4. The exterior trim according to claim 1, further comprising a shape-retaining trim element (46) which is adjustable between a folded-in position in which the shape-retaining trim element (46) forms a part of the exterior trim and a folded-out position in which the exterior trim part (10) at least substantially solely forms the exterior trim of a side sill (44).

5. The exterior trim according to claim 1, further comprising an actuating element (34), wherein the central shape-retaining subcomponent (14) is adjustable between the first position (A) and the second position (W) via the actuating element (34) and wherein the actuating element (34) is disposed on an interior side of the exterior trim part (10) that faces away from an outside (22) of the exterior trim part (10).

6. The exterior trim according to claim 5, further comprising a decorative element (42) disposed on the outside (22) of the exterior trim part (10) and in a region of the actuating element (34).

7. The exterior trim according to claim 1, wherein the exterior trim is formed as a longitudinal sill trim of a side sill (28, 44) of the motor vehicle.

8. A method for adjusting the exterior trim for a motor vehicle according to claim 1, comprising:
   when adjusting the central shape-retaining subcomponent (14) from the first position (A) into the second position (W), the first trim surface (26) and the second trim surface (26) is reversibly changed by applying a force.

* * * * *